US010635078B2

(12) United States Patent
Tanimoto et al.

(10) Patent No.: US 10,635,078 B2
(45) Date of Patent: Apr. 28, 2020

(54) SIMULATION SYSTEM, SIMULATION METHOD, AND SIMULATION PROGRAM (71) Applicants: NEC CORPORATION, Tokyo (JP); NEC Solution Innovators, Ltd., Tokyo (JP)

(72) Inventors: Akira Tanimoto, Tokyo (JP); Yousuke Motohashi, Tokyo (JP); Mamoru Iguchi, Tokyo (JP)

(73) Assignees: NEC CORPORATION, Minato-ku, Tokyo (JP); NEC Solution Innovators, Ltd., Koto-ku, Tokyo (JP)

( * ) Notice: Subject to any disclaimer, the term of this patent is extended or adjusted under 35 U.S.C. 154(b) by 320 days.

(21) Appl. No.: 15/553,629

(22) PCT Filed: Mar. 23, 2015

(86) PCT No.: PCT/JP2015/001628
§ 371 (c)(1),
(2) Date: Aug. 25, 2017

(87) PCT Pub. No.: WO2016/151620
PCT Pub. Date: Sep. 29, 2016

(65) Prior Publication Data
US 2018/0052441 A1 Feb. 22, 2018

(51) Int. Cl.
*G05B 19/406* (2006.01)
*G06N 20/00* (2019.01)
(Continued)

(52) U.S. Cl.
CPC .......... *G05B 19/406* (2013.01); *G05B 17/02* (2013.01); *G06N 20/00* (2019.01); *G06Q 10/063* (2013.01);
(Continued)

(58) Field of Classification Search
CPC .......... G05B 19/406; G05B 2219/2639; G06N 20/00
(Continued)

(56) References Cited

U.S. PATENT DOCUMENTS 6,947,876 B1* 9/2005 Galarza ................. G05B 17/02
700/28
7,072,863 B1* 7/2006 Phillips .................. G06Q 40/00
703/2
(Continued)

FOREIGN PATENT DOCUMENTS

JP 2007-004769 A 1/2007
JP 2007-233944 A 9/2007
(Continued)

OTHER PUBLICATIONS

Urabe (JP2007233944A; IDS dated: Aug. 25, 2017—Global Dos. Translation) (Year: 2007).*
(Continued)

*Primary Examiner* — Rehana Perveen
*Assistant Examiner* — Justin C Mikowski
(74) *Attorney, Agent, or Firm* — Sughrue Mion, PLLC (57) ABSTRACT

Reception means 81 receives an estimator learned using measured data up to a point of time in the past, verification data that is measured data from the point of time onward, and an update rule prescribing whether or not the estimator needs to be updated based on an evaluation index. Simulation means 82 simulates at least one of the evaluation index of the estimator and an update result of the estimator in a predetermined period, based on the update rule and an estimation result calculated by applying the verification data of the predetermined period to the estimator in chronological order.

11 Claims, 7 Drawing Sheets

(51) Int. Cl.
*G06Q 10/06* (2012.01)
*G05B 17/02* (2006.01)
*G06Q 50/06* (2012.01)

(52) U.S. Cl.
CPC ..... *G06Q 50/06* (2013.01); *G05B 2219/2639* (2013.01)

(58) Field of Classification Search
USPC .......................................................... 703/6
See application file for complete search history.

(56) References Cited

U.S. PATENT DOCUMENTS

| | | | | |
|---|---|---|---|---|
| 8,165,853 B2 * | 4/2012 | Pinto | ................... | G06Q 40/025 |
| | | | | 700/44 |
| 8,548,777 B2 * | 10/2013 | Sturrock | ................ | G06N 20/00 |
| | | | | 703/6 |
| 8,620,847 B2 * | 12/2013 | Suzuki | ............... | G01C 21/3492 |
| | | | | 706/45 |
| 2010/0205181 A1 * | 8/2010 | Chidlovskii | ............ | G06F 16/29 |
| | | | | 707/741 |
| 2012/0239213 A1 * | 9/2012 | Nagata | ................... | G06Q 10/04 |
| | | | | 700/291 |
| 2013/0185039 A1 * | 7/2013 | Tesauro | ............... | G06Q 10/063 |
| | | | | 703/6 |
| 2013/0197890 A1 * | 8/2013 | Ide | .................... | G01C 21/3484 |
| | | | | 703/6 |
| 2014/0351183 A1 * | 11/2014 | Germain | ............ | G06F 17/5009 |
| | | | | 706/12 |

FOREIGN PATENT DOCUMENTS

JP 2011-253275 A 12/2011
JP 2012-194700 A 10/2012

OTHER PUBLICATIONS

International Search Report for PCT/JP2015/001628 dated Jun. 23, 2015 [PCT/ISA/210].
Written Opinion for PCT/JP2015/001628 dated Jun. 23, 2015 [PCT/ISA/237].

* cited by examiner

| ID | RELEARNING DETERMINATION | | OBJECT SELECTION | RELEARNING DATA GENERATION METHOD | DETERMINATION OF SHIPPING AFTER RELEARNING | |
|---|---|---|---|---|---|---|
| | EVALUATION INDEX | LOGICAL STRUCTURE | | | EVALUATION INDEX | LOGICAL STRUCTURE |
| RETAIL DEMAND PREDICTION (ASSUMPTION) | 60 DAYS OR MORE PASSED FROM PREVIOUS LEARNING? | OR | PERFORM RELEARNING BY ALL MEANS | min (MAXIMUM SAMPLE PERIOD, ONE MONTH) | ERROR RATE IMPROVED? | AND |
| | DATA INCREASE: max (ONE MONTH, CURRENT LEARNING PERIOD) TWICE AS LONG AS PREVIOUS LEARNING PERIOD? | OR | | | ERROR RATE OF EACH PREDICTION FORMULA (EXCESSIVELY HIGH OR EXCESSIVELY LOW)? | |
| | DATA INCREASE: SEASON CHANGED (SUCH AS THREE MONTHS) | AND | | | PREDICTION FORMULA HAS AT LEAST SPECIFIC NUMBER OF SAMPLES? | |
| | LESS THAN ONE YEAR? | OR | | | NO SAMPLE WITH PREDICTION VALUE VARYING TWICE OR MORE? | |
| | DATA INCREASE: NEW PREDICTION OBJECT SUCH AS NEW PRODUCT EMERGED? | OR | | | | |
| | DATA INCREASE: EXPLANATORY VARIABLE INCREASED? | OR | | | | |
| | FOUR DAYS OR MORE PASSED FROM PREVIOUS LEARNING? | | PERFORM RELEARNING IN FOLLOWING ORDER IF CONDITION IS SATISFIED | | | |
| | DAILY AVERAGE ERROR RATE DETERIORATED BY 10% OR MORE IN MOST RECENT WEEK FROM PREVIOUS WEEK? | AND | CALCULATE SCORE VALUE BY LINEAR SUM OF THESE NUMBERS (OR 1/0) AND SELECT FROM TOP WITHIN 10% OF WHOLE | | | |
| | MAXIMUM ERROR RATE DETERIORATED BY 20% OR MORE IN MOST RECENT WEEK FROM PREVIOUS WEEK? | | | | | |
| | ANY COMPONENT WHOSE DAILY AVERAGE ERROR RATE DETERIORATED BY 30% OR MORE IN MOST RECENT WEEK FROM PREVIOUS WEEK? | OR | | | | |
| | DISTRIBUTION OF EXPLANATORY VARIABLE USED IN GATE FUNCTION GREATLY CHANGED? (DETERMINED BASED ON KL DISTANCE ASSUMING GAUSSIAN DISTRIBUTION) | | | | | |
| | ANY COMPONENT WHOSE NUMBER OF SAMPLES DECREASED TO 1/3 OR LESS? | | | | | |

SIMULATION SYSTEM, SIMULATION METHOD, AND SIMULATION PROGRAM

CROSS REFERENCE TO RELATED APPLICATIONS

This application is a National Stage of International Application No. PCT/JP2015/001628 filed Mar. 23, 2015, the contents of all of which are incorporated herein by reference in their entirety.

TECHNICAL FIELD

The present invention relates to a simulation system, simulation method, and simulation program for simulating operation using an estimator.

BACKGROUND ART

Estimators are known to degrade in estimation accuracy over time due to environmental changes and the like. For example, an estimator is expressed as a function indicating regularity between a response variable and an explanatory variable. Hence, an estimator determined to improve in accuracy by updating is subjected to relearning, and updated with an estimator generated as a result of the relearning as a new estimator.

For example, Patent Literature (PTL) 1 describes an apparatus for predicting the energy demands of various facilities. The apparatus described in PTL 1 sequentially updates energy demand prediction models whenever a predetermined period has passed, using data acquired a day ago, data acquired an hour ago, or data acquired a minute ago.

CITATION LIST

Patent Literature

PTL 1: Japanese Patent Application Laid-Open No. 2012-194700

SUMMARY OF INVENTION

Technical Problem

Manually monitoring the accuracy of an estimator and manually determining whether or not to update the estimator is a complex work. It is therefore preferable to set a rule for determining whether or not to update the estimator and, based on the set rule, automatically or semi-automatically determine whether or not to update the estimator.

However, since situations to be estimated are future situations, there is a technical problem in that the administrator has difficulty in determining which rule is appropriate. This is because the determination of whether or not to update the estimator involves not only the accuracy of the estimator but also the costs required for the update.

In detail, various costs (machine resources, financial costs, personnel costs for humans to newly understand the updated estimator, etc.) are required when updating the estimator, so that frequently updating the estimator is not preferable. Meanwhile, there is also a possibility that the accuracy of the estimator decreases if the estimator update frequency is excessively low. Besides, updating the estimator does not necessarily lead to improved estimation accuracy.

The method of updating a prediction model regardless of whether or not its accuracy has decreased as in the apparatus described in PTL 1 has a technical problem of placing a significant burden on the operator during actual operation, because considerable resources and costs are needed to update the estimator. It is therefore preferable if a suitable rule for updating the estimator can be examined based on the costs required for the update and the improvement in estimation accuracy resulting from the update.

The present invention accordingly has an object of providing a simulation system, simulation method, and simulation program that can simulate the suitability of a rule for updating an estimator.

Solution to Problem

A simulation system according to the present invention includes: reception means which receives an estimator learned using measured data up to a point of time in the past, verification data that is measured data from the point of time onward, and an update rule prescribing whether or not the estimator needs to be updated based on an evaluation index; and simulation means which simulates at least one of the evaluation index of the estimator and an update result of the estimator in a predetermined period, based on the update rule and an estimation result calculated by applying the verification data of the predetermined period to the estimator in chronological order.

A simulation method according to the present invention is performed by a computer, and includes: receiving an estimator learned using measured data up to a point of time in the past, verification data that is measured data from the point of time onward, and an update rule prescribing whether or not the estimator needs to be updated based on an evaluation index; and simulating at least one of the evaluation index of the estimator and an update result of the estimator in a predetermined period, based on the update rule and an estimation result calculated by applying the verification data of the predetermined period to the estimator in chronological order.

A simulation program according to the present invention causes a computer to execute: a reception process of receiving an estimator learned using measured data up to a point of time in the past, verification data that is measured data from the point of time onward, and an update rule prescribing whether or not the estimator needs to be updated based on an evaluation index; and a simulation process of simulating at least one of the evaluation index of the estimator and an update result of the estimator in a predetermined period, based on the update rule and an estimation result calculated by applying the verification data of the predetermined period to the estimator in chronological order.

Advantageous Effects of Invention

According to the present invention, the technical means described above achieve the technical advantageous effect of simulating the suitability of a rule for updating an estimator.

BRIEF DESCRIPTION OF DRAWINGS

FIG. 2 is an explanatory diagram depicting an example of an evaluation index, a relearning rule, and an update evaluation rule.

DESCRIPTION OF EMBODIMENT

The following describes exemplary embodiments of the present invention with reference to drawings.

Exemplary Embodiment 1

Figure 1:
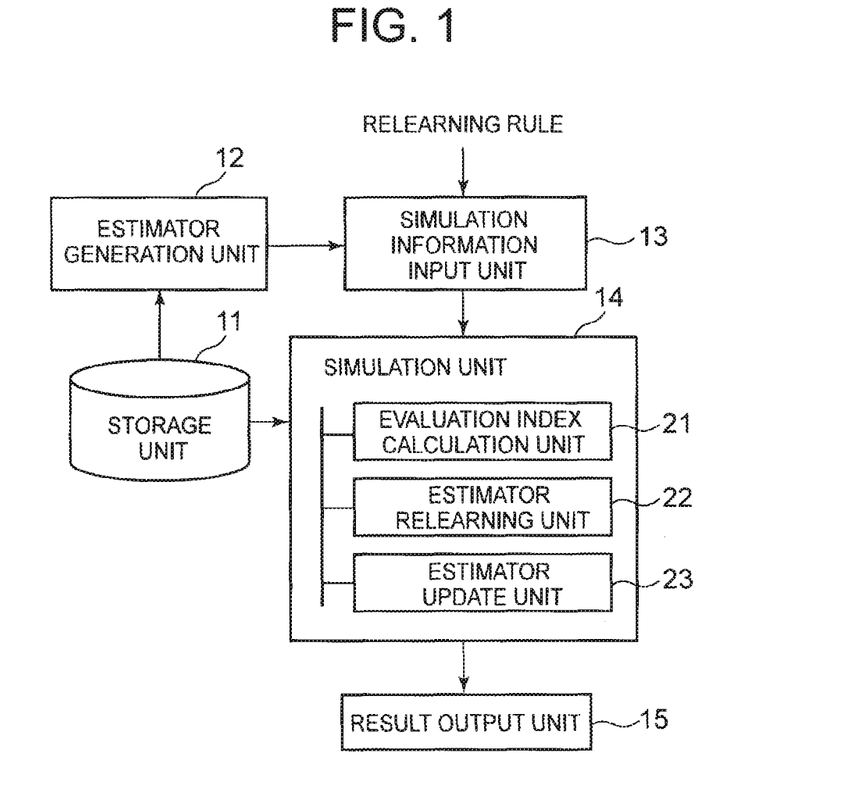
FIG. 1 is an explanatory diagram depicting an example of the structure of Exemplary Embodiment 1 of a simulation system according to the present invention.

FIG. 1 is an explanatory diagram depicting an example of the structure of Exemplary Embodiment 1 of a simulation system according to the present invention. The simulation system in this exemplary embodiment includes a storage unit 11, an estimator generation unit 12, a simulation information input unit 13, a simulation unit 14, and a result output unit 15.

The storage unit 11 stores past measured data used as learning data, and data necessary for each process in the simulation system. The storage unit 11 is realized by, for example, a magnetic disk device.

The estimator generation unit 12 generates an estimator based on a predetermined algorithm using, as learning data, measured data up to a point of time in the past stored in the storage unit 11. The estimator generation unit 12 feeds the generated estimator to the simulation information input unit 13. The estimator generation unit 12 may use part or all of the measured data up to the point of time in the past, as learning data. The estimator is expressed as, for example, a function indicating regularity between a response variable and an explanatory variable as mentioned above.

Any algorithm may be used when generating the estimator. For example, the estimator generation unit 12 may generate the estimator based on factorized-asymptotic Bayesian (FAB), or generate the estimator based on a kernel support vector machine (SVM), a decision tree, or the like. The number of algorithms used by the estimator generation unit 12 is not limited to one, and the estimator generation unit 12 may generate the estimator using a combination of a plurality of algorithms.

The simulation information input unit 13 receives the estimator generated by the estimator generation unit 12. The simulation information input unit 13 also receives measured data following the learning data used for the learning of the estimator. In detail, the simulation information input unit 13 reads part or all of the measured data from the point of time in the past onward, from the storage unit 11. Part or all of the measured data from the point of time in the past onward which is used for simulation is hereafter referred to as verification data. Since the period of the verification data is the period for which the below-mentioned simulation unit 14 performs a simulation process, the period of the received verification data can be regarded as a simulation period.

The simulation information input unit 13 further receives an update rule for the estimator. The update rule is a rule prescribing, based on a predetermined evaluation index, whether or not the estimator needs to be updated. Here, the update rule includes not only a rule for determining whether or not to actually update the estimator, but also a rule for determining whether or not to relearn the estimator as a preliminary stage for the update.

In the update rule, the rule for determining whether or not to relearn the estimator is hereafter referred to as a relearning rule, and the rule for determining whether or not to actually update the estimator after the relearning as an update evaluation rule. The relearning rule can be regarded as a rule prescribing, based on a predetermined evaluation index, whether or not the estimator needs to be relearned. The update evaluation rule can be regarded as a rule prescribing the status of change between the evaluation index of the estimator before the update and the evaluation index of the estimator after the update. The following assumes that the update rule includes both the relearning rule and the update evaluation rule, unless otherwise stated.

The update rule may include an algorithm for relearning, the period of learning data used, the details of learning data, a method of generating data used as learning data, and the like, in addition to the conditions for determining whether or not to relearn the estimator and whether or not to update the estimator.

The simulation unit 14 includes an evaluation index calculation unit 21, an estimator relearning unit 22, and an estimator update unit 23.

The evaluation index calculation unit 21 calculates a predetermined evaluation index. In detail, the evaluation index calculation unit 21 applies the verification data to the estimator in chronological order, to calculate an estimation result. The evaluation index calculation unit 21 then calculates the evaluation index based on the estimation result. The evaluation index calculation unit 21 may calculate the evaluation index used in the update rule, or calculate any predetermined evaluation index. Moreover, the evaluation index may be calculated at any timing. The evaluation index calculation unit 21 may calculate the evaluation index at a timing prescribed by the update rule, or calculate the evaluation index on a regular basis or at a predetermined timing.

The evaluation index may be any index. Examples of the evaluation index include the period from the previous learning of the estimator, the period from the previous update of the estimator, the amount of increase of learning data, the degree of accuracy decrease over time, and the change of the number of samples. The evaluation index is, however, not limited to such, and any index that can be used to determine whether or not to update the estimator may be used. The evaluation index is also not limited to data calculated from the estimation result.

The estimator relearning unit 22 determines whether or not to relearn the estimator, based on the update rule. In detail, the estimator relearning unit 22 applies the verification data to the estimator in chronological order, and determines whether or not the evaluation index calculated based on the estimation result up to a point of time (hereafter referred to as a determination point of time) of determining whether or not to relearn the estimator conforms to the relearning rule. In the case where the evaluation index conforms to the relearning rule, the estimator relearning unit 22 relearns the estimator based on the method prescribed by the relearning rule.

The estimator relearning unit 22 may relearn all estimators conforming to the relearning rule, or relearn, based on a predetermined rule, only part of the estimators conforming to the relearning rule.

The estimator update unit 23 determines whether or not to update the estimator, based on the update rule. In detail, the estimator update unit 23 identifies the status of change between the evaluation index of the estimator before the update and the evaluation index of the estimator after the update. In the case where the status of change conforms to the update evaluation rule, the estimator update unit 23 updates the original estimator with the relearned estimator. Subsequently, the verification data from the determination point of time onward is applied to the updated estimator in chronological order, to calculate an estimation result.

The status of change prescribed by the update evaluation rule may be any status of change. Examples of the status of change include the change of estimation accuracy and the change of the number of samples used in the estimator.

FIG. 2 is an explanatory diagram depicting an example of the evaluation index, the relearning rule, and the update evaluation rule. The field "relearning determination" depicted in FIG. 2 is a structural element defining the relearning rule, and indicates that the relearning rule is expressed as a condition obtained by joining the respective conditions of the evaluation indices in the column "evaluation index" by the operators in the field "logical structure". The field "object selection" indicates a rule for selecting a relearning object from among the estimators conforming to the relearning rule. The field "relearning data generation method" indicates a method of generating learning data used in relearning. The field "determination of shipping after relearning" is a structural element defining the update evaluation rule, and indicates that the update evaluation rule is expressed as a condition obtained by joining the respective conditions of the evaluation indices in the column "evaluation index" by the operators in the field "logical structure".

The estimator update unit 23 holds update costs such as the number of updates of the estimator, the time required for updating, and machine resources, as a simulation result. The estimator update unit 23 may also hold the status of change (e.g. the estimation accuracy change rate, the change of the number of samples) when determining whether or not to update the estimator, the evaluation index of the estimator after the update, and the like, as a simulation result.

Thus, the simulation unit 14 as a whole simulates the evaluation index of the estimator and the update result of the estimator in a predetermined period, based on the update rule and the estimation result calculated by applying the verification data of the predetermined period to the estimator in chronological order. The simulation unit 14 may simulate at least one of the evaluation index and the update result.

In this exemplary embodiment, after the estimator relearning unit 22 relearns the estimator, the estimator update unit 23 determines whether or not to update the estimator with the relearned estimator. Alternatively, the estimator update unit 23 may update the pre-relearning estimator, without determining whether or not to update the estimator with the relearned estimator. It is, however, more preferable that the estimator update unit 23 determines whether or not to update the estimator based on the status of change between the pre-relearning estimator and the relearned estimator, to thus prevent an inadvertent update of the estimator.

The result output unit 15 outputs the simulation result. In detail, the result output unit 15 outputs at least one of the evaluation index and the update result in the simulation period, as the simulation result of the update rule. The simulation result may be output in any form. For example, the result output unit 15 may output, for each update rule of the estimator, the evaluation index (e.g. accuracy index such as average error, average error rate, or maximum error rate), the number of relearnings, the number of updates, and the update timing (specific date and time) of the estimator in the simulation period. The result output unit 15 may sort the update rules depending on the numbers and the evaluation index values and output the simulation result.

In the case where simulation is performed with a plurality of update rules, the result output unit 15 may display the simulation result for each update rule. The plurality of update rules are, for example, rules obtained by changing a variable threshold used in an update rule. For example, N in an update rule "daily average error rate deteriorated by N (%) in most recent week from previous week" is a variable threshold (parameter).

The result output unit 15 may visualize the simulation result using a graph so as to be easily recognizable to humans. In detail, the result output unit 15 may define a multidimensional space in which any of the evaluation index and the index representing the update result is set in each dimensional axis, and plot the simulation result at the corresponding position in the multidimensional space.

Figure 3:
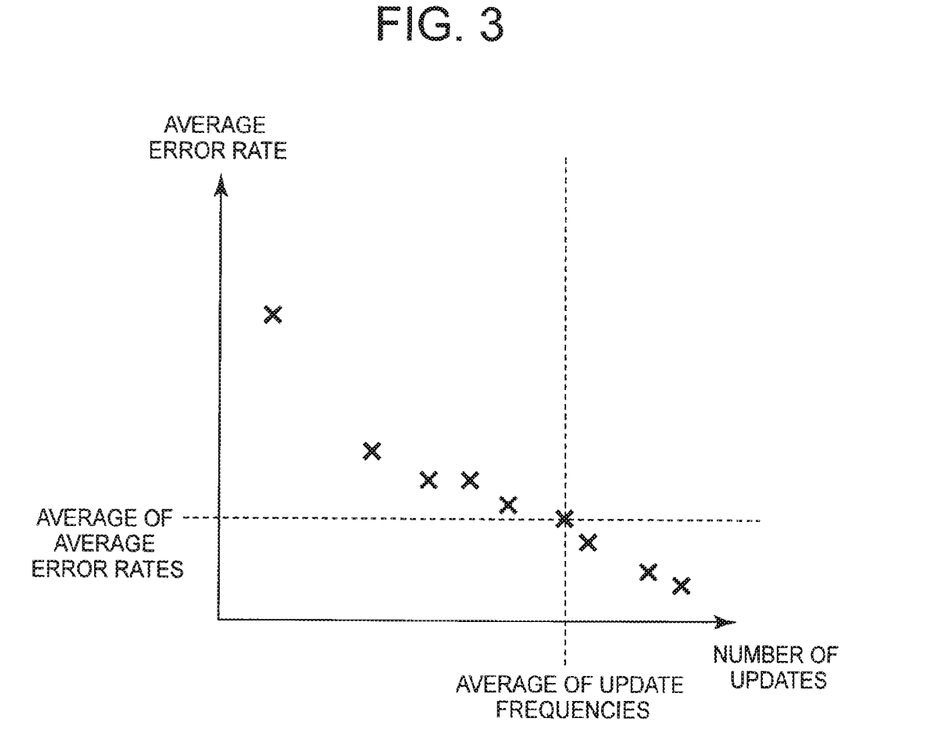
FIG. 3 is an explanatory diagram depicting an example of visualizing a simulation result.

FIG. 3 is an explanatory diagram depicting an example of visualizing the simulation result. In the example depicted in FIG. 3, the number of updates is set in the X axis and the average error rate is set in the Y axis in a two-dimensional space. The result output unit 15 may plot each simulation result obtained through simulation with a variable parameter, at the corresponding position in the graph. The result output unit 15 may output the average of the numbers of updates and the average of the average error rates in the case of performing simulation with a variable parameter, as depicted in FIG. 3.

In the case where a plurality of learning algorithms of the estimator are assumed, the result output unit 15 may output simulation results obtained using different learning algorithms. In detail, the simulation unit 14 may simulate the estimator learned using each of the different learning algorithms, and the result output unit 15 may output the simulation result (evaluation index, etc.) for each learning algorithm.

This eases comparison with an accuracy-oriented learning algorithm or a learning algorithm with high interpretiveness. Moreover, by outputting the evaluation index for each learning algorithm, it is possible to implement, for example, a function of switching a learner depending on a condition prescribed using the evaluation index. This ensures optimality for the learner as well, so that the cost of evaluating whether or not the learner is good by humans (analyst, administrator, customer, etc.) can be saved.

The result output unit 15 may not only output the simulation result, but also search for an optimal solution from the simulation result and output the search result. In detail, the result output unit 15 may search for an optimal solution for the simulated evaluation index and update result, and output an update rule with which the optimal solution is obtained.

The estimator generation unit 12, the simulation information input unit 13, the simulation unit 14 (more specifically, the evaluation index calculation unit 21, the estimator relearning unit 22, and the estimator update unit 23), and the result output unit 15 are realized by a CPU in a computer operating according to a program (simulation program).

For example, the program may be stored in the storage unit 11, with the CPU reading the program and, according to the program, operating as the estimator generation unit 12, the simulation information input unit 13, the simulation unit 14 (more specifically, the evaluation index calculation unit 21, the estimator relearning unit 22, and the estimator update unit 23), and the result output unit 15.

Alternatively, the estimator generation unit 12, the simulation information input unit 13, the simulation unit 14 (more specifically, the evaluation index calculation unit 21, the estimator relearning unit 22, and the estimator update unit 23), and the result output unit 15 may each be realized by dedicated hardware. The simulation system according to the present invention may be composed of two or more physically separate apparatuses that are wiredly or wirelessly connected to each other.

Figure 4:
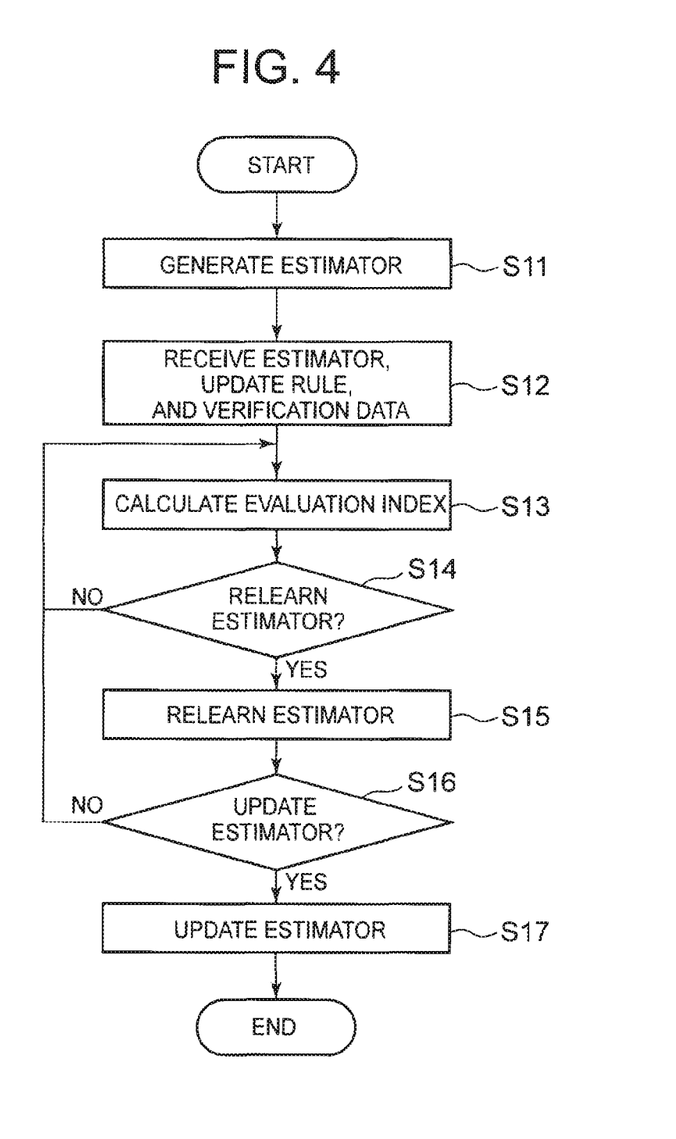
FIG. 4 is a flowchart depicting an example of the operation of the simulation system in Exemplary Embodiment 1.

The following describes the operation of the simulation system in this exemplary embodiment. FIG. 4 is a flowchart depicting an example of the operation of the simulation system in this exemplary embodiment.

The estimator generation unit 12 generates an estimator using learning data up to a point of time in the past stored in the storage unit 11 (step S11), and feeds the generated estimator to the simulation information input unit 13. The simulation information input unit 13 receives the generated estimator, an update rule, and verification data, and feeds them to the simulation unit 14 (step S12).

In the simulation unit 14, the evaluation index calculation unit 21 calculates an evaluation index of the estimator (step S13). The estimator relearning unit 22 determines whether or not to relearn the estimator, based on the update rule (step S14). In the case of determining not to relearn the estimator (No in step S14), the process from step S13 is repeated for the next determination point of time. In the case of determining to relearn the estimator (Yes in step S14), the estimator relearning unit 22 relearns the estimator based on a method prescribed by the relearning rule (step S15).

The estimator update unit 23 determines whether or not to update the estimator, based on the update rule (step S16). In the case of determining not to update the estimator (No in step S16), the process from step S13 is repeated for the next determination point of time. In the case of determining to update the estimator (Yes in step S16), the estimator update unit 23 updates the original estimator with the relearned estimator (step S17).

As described above, in this exemplary embodiment, the simulation unit 14 receives an estimator learned using measured data (learning data) up to a point of time in the past, verification data, and an update rule (specifically, a relearning rule and an evaluation rule), from the simulation information input unit 13. The simulation unit 14 then simulates at least one of an evaluation index of the estimator and an update result of the estimator in a predetermined period, based on the update rule and an estimation result calculated by applying the verification data of the predetermined period to the estimator in chronological order. The simulation unit 14 is realized by the evaluation index calculation unit 21, the estimator relearning unit 22, and the estimator update unit 23. The suitability of the rule for updating the estimator can thus be simulated.

The following describes operation in this exemplary embodiment using a specific example, although the scope of the present invention is not limited to such. In this specific example, the simulation system simulates, using learning data of the past year, the update cost (the number of updates) of the estimator in one year and the average estimation accuracy of the estimator in one year on the assumption that a given update rule is set.

In this specific example, the storage unit 11 stores measured data from Jan. 1, 2014 to Dec. 31, 2014, as the learning data of the past year. Suppose a point of time in the past is Jan. 31, 2014. The measured data is then divided into learning data from Jan. 1, 2014 to Jan. 31, 2014 and verification data from Feb. 1, 2014 to Dec. 31, 2014.

The estimator generation unit 12 generates an estimator based on the former learning data, and feeds the generated estimator to the simulation information input unit 13. The simulation information input unit 13 also receives the update rule to be simulated, from the administrator. For example, the simulation information input unit 13 receives an update rule "the estimation formula is updated if the error in sales volume exceeds 10% for three consecutive days" (hereafter referred to as update rule R1), an update rule "the estimation formula is updated if the error in sales volume exceeds 15% for three consecutive days" (hereafter referred to as update rule R2), and an update rule "the estimation formula is updated on the same day if the error in sales volume exceeds 30%" (hereafter referred to as update rule R3).

The simulation unit 14 (more specifically, the evaluation index calculation unit 21, the estimator relearning unit 22, or the estimator update unit 23) applies the verification data to the generated estimation formula, and performs simulation according to each received update rule. The result output unit 15 outputs the update cost (the number of updates) and the average estimation accuracy of the estimator, as the simulation result for each update rule.

As a result of the result output unit 15 outputting such a simulation result, the administrator can recognize beforehand the operation result (specifically, update cost and estimation accuracy) obtained if an update rule is set. Hence, the administrator can appropriately and easily examine which update rule is to be set. In the aforementioned example, the administrator can determine which of the update rules R1 to R3 is more appropriate.

The following describes a modification of this exemplary embodiment. Exemplary Embodiment 1 describes the case where the simulation information input unit 13 receives an update rule prescribed based on a predetermined evaluation index. For example, a plurality of conditions including variable thresholds (parameters) are listed in the column "evaluation index" in the field "relearning determination" in FIG. 2.

The simulation information input unit 13 in this modification automatically determines a parameter to be tried, using a predetermined algorithm. In detail, the simulation information input unit 13 identifies an optimal parameter using a predetermined algorithm from among a plurality of update rules that include one or more variable thresholds (parameters) in the conditions, and sets an update rule defined by the identified parameter as input.

The object of optimization may be any object. The object of optimization is, for example, the aforementioned evaluation index (such as accuracy index). As the algorithm when determining the parameter, a genetic algorithm or Bayesian optimization (Gaussian process) is used as an example. These algorithms can be used even in the case where there are a plurality of optimization objects.

By the simulation information input unit 13 setting an update rule defined by an optimal parameter from among a plurality of update rules as input, more efficient simulation is possible than in the case of simulating all variable thresholds (parameters) included in the plurality of conditions.

Exemplary Embodiment 2

The following describes Exemplary Embodiment 2 of a simulation system according to the present invention. In Exemplary Embodiment 1, the estimator relearning unit 22 relearns the estimator based on the evaluation index calculated by the evaluation index calculation unit 21. This exemplary embodiment describes a method of reducing the processing load of relearning.

Figure 5:
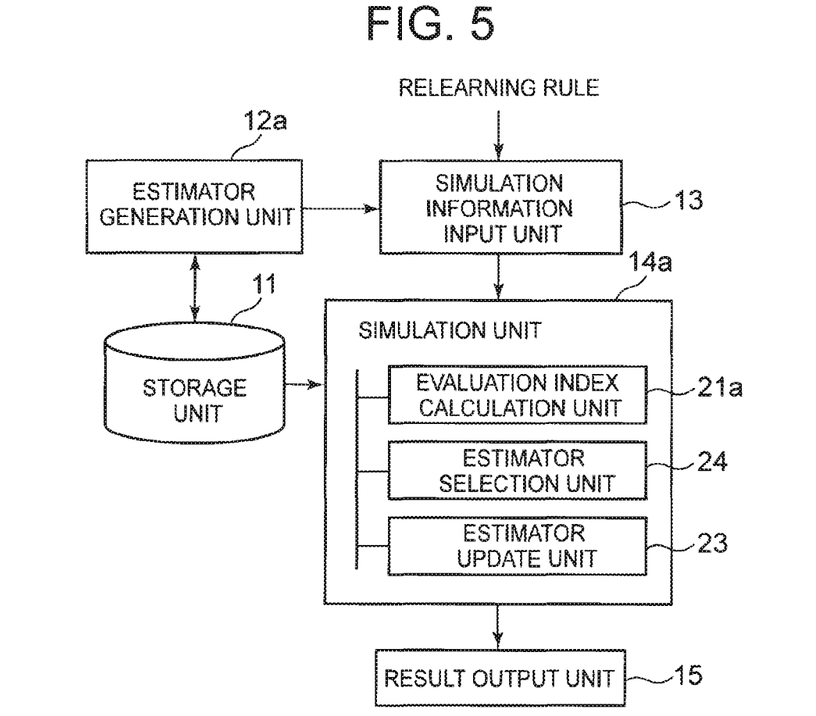
FIG. 5 is an explanatory diagram depicting an example of the structure of Exemplary Embodiment 2 of a simulation system according to the present invention.

FIG. 5 is an explanatory diagram depicting an example of the structure of Exemplary Embodiment 2 of a simulation system according to the present invention. The same structural elements as in Exemplary Embodiment 1 are given the same reference signs as in FIG. 1, and their description is omitted. The simulation system in this exemplary embodiment includes the storage unit 11, an estimator generation unit 12a, the simulation information input unit 13, a simulation unit 14a, and the result output unit 15. The storage unit 11, the simulation information input unit 13, and the result output unit 15 in this exemplary embodiment are the same as those in Exemplary Embodiment 1.

The estimator generation unit 12a in this exemplary embodiment generates an estimator based on a predetermined algorithm using, as learning data, data groups (hereafter referred to as interval learning data) obtained by dividing the measured data stored in the storage unit 11 into predetermined intervals. A plurality of sets of interval learning data are generated, where the granularity of each interval is any granularity. Each interval is, for example, defined by a start time and a period. Each interval is preferably set to a period used for relearning in actual operation. The intervals may overlap each other.

The estimator generation unit 12a also calculates an evaluation index at each estimation timing (hereafter referred to as a prediction target) in the period during which the verification data is applied to the generated estimator in chronological order. The method of calculating the evaluation index is the same as the method of calculating the evaluation index by the evaluation index calculation unit 21 in Exemplary Embodiment 1. The prediction target is set at the same granularity as the timing of performing relearning determination in actual operation, such as per month.

The estimator generation unit 12a generates a data set by combining the generated estimator and the evaluation result, and stores the generated data set in the storage unit 11. For example, the estimator generation unit 12a may generate a data set including the learning interval, prediction target, and evaluation index of the estimator.

Figure 6:
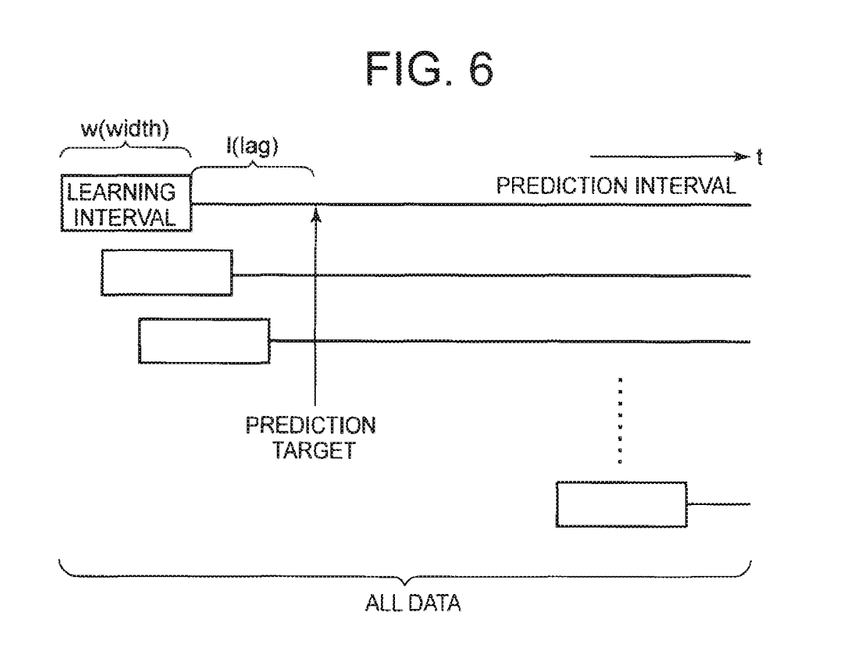
FIG. 6 is an explanatory diagram depicting an example of a generated data set.

FIG. 6 is an explanatory diagram depicting an example of the generated data set. In the example depicted in FIG. 6, an estimator is generated using interval learning data of a learning interval w, and a plurality of evaluation indices each at a prediction target after a fixed period 1 from the learning interval are generated.

The simulation unit 14a includes an evaluation index calculation unit 21a, an estimator selection unit 24, and the estimator update unit 23. The estimator update unit 23 is the same as that in Exemplary Embodiment 1.

The evaluation index calculation unit 21a calculates the evaluation index. The evaluation index calculation unit 21a in this exemplary embodiment extracts the evaluation index of the prediction target corresponding to the point of time of calculating the evaluation index from the storage unit 11, instead of calculating the evaluation index. In the case where the evaluation index of the corresponding prediction target is not stored in the storage unit 11, the evaluation index calculation unit 21a may actually calculate the evaluation index. The method of calculating the evaluation index is the same as the method of calculating the evaluation index by the evaluation index calculation unit 21 in Exemplary Embodiment 1.

The estimator selection unit 24 determines whether or not to relearn the estimator based on an update rule, in the same way as the estimator relearning unit 22 in Exemplary Embodiment 1. In this exemplary embodiment, in the case where the evaluation index conforms to the update rule (relearning rule), the estimator selection unit 24 extracts a relearned estimator from the storage unit 11 based on the update rule. For example, the estimator selection unit 24 may extract an estimator matching a learning interval prescribed by the update rule, from the storage unit 11. In the case where an appropriate estimator is not stored in the storage unit 11, the estimator selection unit 24 may relearn the estimator in the same way as the estimator relearning unit 22 in Exemplary Embodiment 1.

The estimator update unit 23 determines whether or not to update the estimator based on the update rule, and updates the pre-relearning estimator. The method of determining whether or not to update the estimator is the same as that in Exemplary Embodiment 1. Subsequently, whether or not to perform relearning at each prediction target is determined using the evaluation index extracted together with the updated estimator.

The estimator generation unit 12a, the simulation information input unit 13, the simulation unit 14a (more specifically, the evaluation index calculation unit 21a, the estimator selection unit 24, and the estimator update unit 23), and the result output unit 15 are realized by a CPU in a computer operating according to a program (simulation program).

Alternatively, the estimator generation unit 12a, the simulation information input unit 13, the simulation unit 14a (more specifically, the evaluation index calculation unit 21a, the estimator selection unit 24, and the estimator update unit 23), and the result output unit 15 may each be realized by dedicated hardware.

Figure 7:
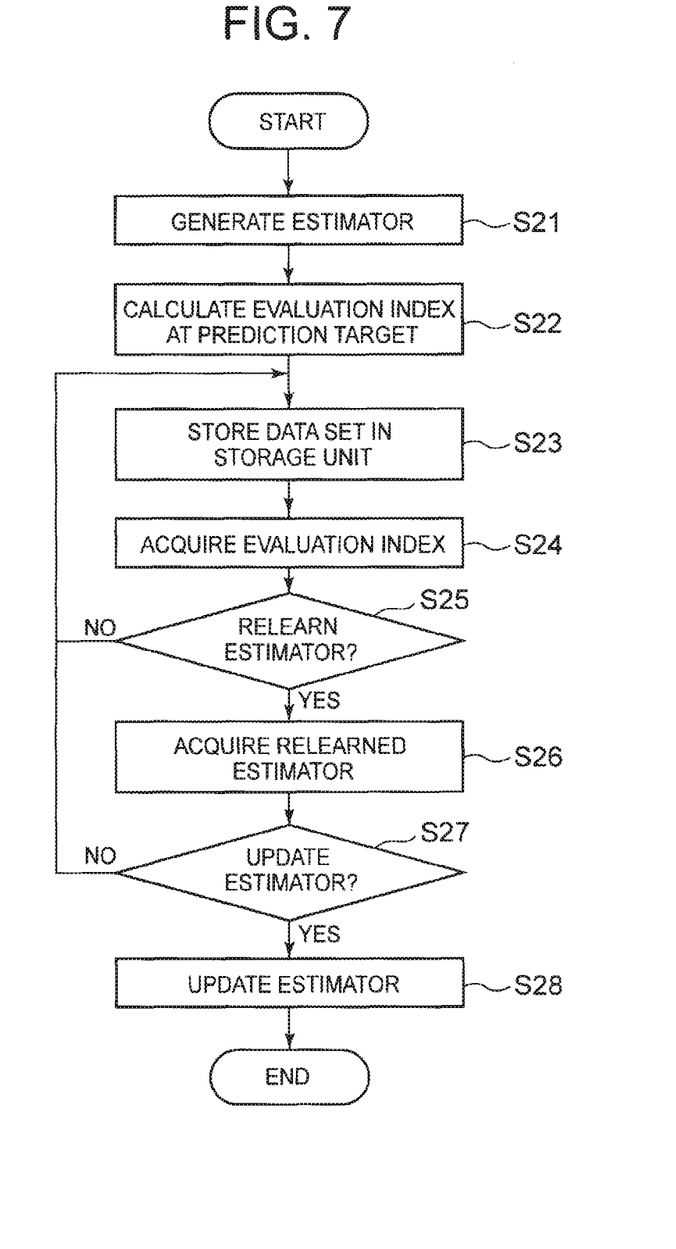
FIG. 7 is a flowchart depicting an example of the operation of the simulation system in Exemplary Embodiment 2.

The following describes the operation of the simulation system in this exemplary embodiment. FIG. 7 is a flowchart depicting an example of the operation of the simulation system in this exemplary embodiment.

The estimator generation unit 12a generates an estimator using interval learning data (step S21). The estimator generation unit 12a also calculates an evaluation index at a prediction target of the generated estimator (step S22). The estimator generation unit 12a stores a data set including the generated estimator and the evaluation index in the storage unit 11 (step S23).

The evaluation index calculation unit 21a acquires the evaluation index at the prediction target of the estimator, from the storage unit 11 (step S24). The estimator selection unit 24 determines whether or not to relearn the estimator, based on the update rule (step S25). In the case of determining not to relearn the estimator (No in step S25), the process from step S24 is repeated for the next prediction target. In the case of determining to relearn the estimator (Yes in step S25), the estimator selection unit 24 acquires a relearned estimator from the storage unit 11 based on the update rule (step S26).

The estimator update unit 23 determines whether or not to update the estimator, based on the update rule (step S27). In the case of determining not to update the estimator (No in step S27), the process from step S24 is repeated for the next prediction target. In the case of determining to update the estimator (Yes in step S27), the estimator update unit 23 updates the original estimator with the relearned estimator (step S28).

As described above, in this exemplary embodiment, the estimator generation unit 12a generates an estimator using past measured data as learning data, and the storage unit 11 stores the generated estimator. In detail, the estimator generation unit 12a generates an estimator using, as learning data, data groups obtained by dividing measured data into predetermined intervals. The estimator generation unit 12a then calculates an evaluation index of each prediction target, generates a data set including the generated estimator and the evaluation index of each prediction target, and stores the generated data set in the storage unit 11. The simulation unit 14a extracts an evaluation index of a prediction target corresponding to the point of time of calculating the evaluation index, from the storage unit 11. In the case where the extracted evaluation index conforms to the update rule, the simulation unit 14a extracts a relearned estimator from the storage unit 11 based on the update rule, and updates the estimator with the relearned estimator. The simulation unit 14a is realized by the evaluation index calculation unit 21a, the estimator selection unit 24, and the estimator update unit 23. The relearning cost can thus be reduced, in addition to the advantageous effects of Exemplary Embodiment 1.

For example, in the case of performing simulation a plurality of times with a variable parameter used in an update rule, there is a high possibility that the same relearning is performed. By preparing the relearned estimator and the evaluation index beforehand as in this exemplary embodiment, the need to perform relearning for each simulation is obviated, as a result of which the cost can be reduced.

The following describes a modification of Exemplary Embodiment 2. Exemplary Embodiment 2 describes the case where the estimator generation unit 12a generates the estimator and the evaluation index beforehand. There is, however, no need to generate the estimators and evaluation indices corresponding to all interval learning data beforehand. This modification describes a method of generating an estimator corresponding to interval learning data according to need. The structure in this modification is the same as that in Exemplary Embodiment 2.

In this modification, the estimator generation unit 12a does not store the data sets including the estimators generated based on the interval learning data and the evaluation results, or stores only part of the data sets and the estimators.

The evaluation index calculation unit 21a searches the storage unit 11 for a data set of a prediction target corresponding to the point of time of calculating the evaluation index. In the case where the data set of the corresponding prediction target is stored in the storage unit 11, the evaluation index calculation unit 21a extracts the data set, and uses the extracted evaluation index as the evaluation index of the prediction target. In the case where the data set of the corresponding prediction target is not stored in the storage unit 11, the evaluation index calculation unit 21a instructs the estimator generation unit 12a to generate the data set including the estimator and the prediction result. Alternatively, the evaluation index calculation unit 21a may generate the data set.

The estimator generation unit 12a, having received the data set generation instruction from the evaluation index calculation unit 21a, generates the estimator based on the predetermined algorithm, and stores the generated estimator in the storage unit 11. The estimator generation unit 12a also calculates the evaluation index of the prediction target using the generated estimator, and stores the evaluation index in the storage unit 11. Thus, the process in this modification can be regarded as a cache process in the simulation process. The storage unit 11 in this modification may be realized by, for example, cache memory.

The subsequent process of the estimator selection unit 24 determining whether or not to relearn the estimator and the estimator update unit 23 updating the original estimator with the relearned estimator is the same as that in Exemplary Embodiment 2.

Thus, in this modification, the estimator generation unit 12a generates the estimator and the evaluation index at the point of time requested by the evaluation index calculation unit 21a in the simulation. In this case, only the necessary estimator and evaluation index are generated. Hence, in addition to the advantageous effects of Exemplary Embodiment 2, the time required for learning can be reduced as compared with the method of preparing all estimators and evaluation indices beforehand, so that the required machine cost can be reduced.

This modification describes the case of generating the estimator and the evaluation index at the point of time requested by the evaluation index calculation unit 21a in the simulation. Alternatively, the estimator generation unit 12a may generate all estimators based on interval learning data beforehand, and the estimator generation unit 12a may generate the prediction index at the point of time requested by the evaluation index calculation unit 21a in the simulation and store the generated prediction index in the storage unit 11. This saves the storage capacity for storing evaluation indices, while accelerating simulation.

In detail, while estimator relearning (estimator generation) takes a lot of time, the amount of storage of estimators is not very large. Meanwhile, while the estimation process does not take much time, the amount of storage of estimation results is large. By selectively performing these processes depending on the learning time or the storage capacity, the suitability of the rule for updating the estimator can be simulated depending on environment.

This modification describes the case where the generated estimator and evaluation index are sequentially stored in the storage unit 11. However, whether or not to store the generation result in the storage unit 11 and, in the case of storing the generation result, which is to be stored can be freely determined depending on machine resources. Examples of the case of storing the generation result in the storage unit 11 include: (1) the case of not storing anything, (2) the case of storing only the estimator, (3) the case of storing the estimator and the estimation result, and (4) the case of storing the estimator, the estimation result, and the evaluation index. For example, the aforementioned (3) is suitably used when the evaluation index used in the update rule is also tried through trial and error.

Exemplary Embodiment 3

The following describes Exemplary Embodiment 3 of a simulation system according to the present invention. This exemplary embodiment describes a method of evaluating an update rule. The use of the simulation system in this exemplary embodiment makes it possible to evaluate to what extent the update rule determined as optimal reaches a performance limit.

Figure 8:
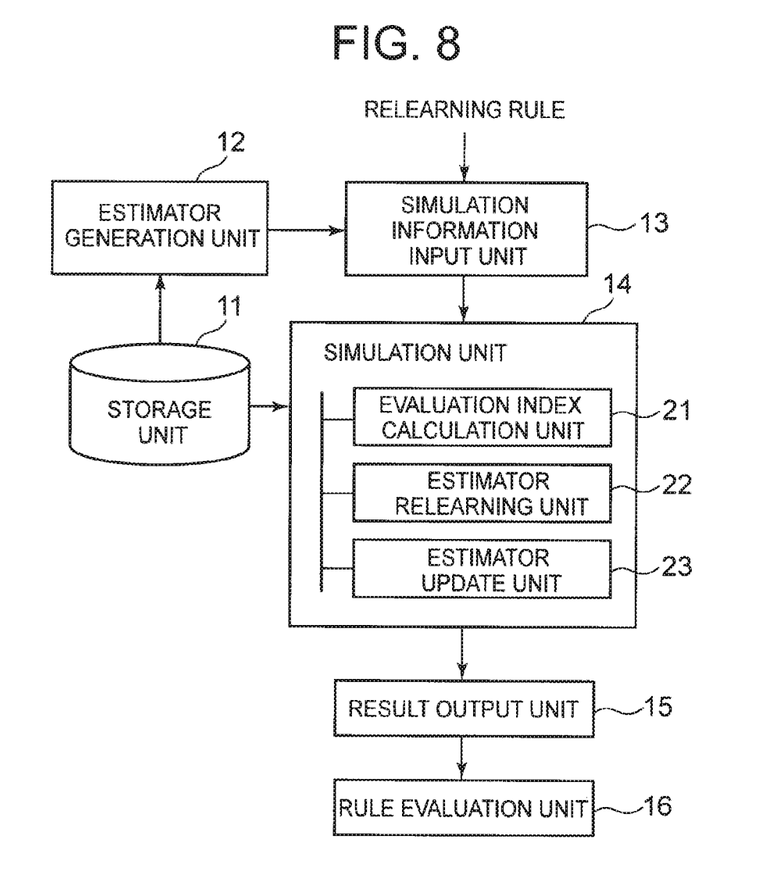
FIG. 8 is an explanatory diagram depicting an example of the structure of Exemplary Embodiment 3 of a simulation system according to the present invention.

FIG. 8 is an explanatory diagram depicting an example of the structure of Exemplary Embodiment 3 of a simulation system according to the present invention. The simulation system in this exemplary embodiment includes the storage unit 11, the estimator generation unit 12, the simulation information input unit 13, the simulation unit 14, the result output unit 15, and a rule evaluation unit 16. The simulation system in this exemplary embodiment differs from that in Exemplary Embodiment 1 in that the rule evaluation unit 16 is further included. The other structural elements are the same as those in Exemplary Embodiment 1.

The rule evaluation unit 16 evaluates an update rule. The rule evaluation unit 16 in this exemplary embodiment evaluates an update rule based on a simulation result. In detail, the rule evaluation unit 16 evaluates the update rule, by comparing the maximum performance attainable in the whole simulation period which is a prediction object interval and the performance in the case of applying the update rule to be evaluated. Here, performance is defined based on a predetermined estimator evaluation index. Examples include evaluation indices including an accuracy index such as an error and an index such as a cost. The performance may be set in any way. For example, any criterion that enables the determination of a more suitable estimator in terms of cost or accuracy may be set.

First, the rule evaluation unit 16 calculates the maximum performance attainable in the whole prediction object interval. In this exemplary embodiment, it is possible to subsequently select a learning interval that maximizes performance in the prediction object interval. Each learning interval may be set in any way. For example, in the case of dividing the prediction target per month, learning intervals such as April, May, etc. are set. The selection of a learning interval that maximizes performance is roughly classified between the case of not restricting the contents of update and the case of restricting the contents of update.

In the case of not restricting the contents of update, the rule evaluation unit 16 selects a learning interval that maximizes performance. The rule evaluation unit 16 calculates an evaluation index indicating performance for each selected learning interval, and calculates the performance of all learning intervals. The performance of all learning intervals is hereafter referred to as an overall index.

For example, the rule evaluation unit 16 may calculate the average value of the respective performances of the learning intervals, as the performance of all learning intervals. Alternatively, the rule evaluation unit 16 may generate the overall index based on the data set generated in Exemplary Embodiment 2, without calculating the evaluation index individually.

In the case of restricting the contents of update, the rule evaluation unit 16 selects, within the restriction, a combination that maximizes performance with an update timing, a learning interval, and a learning parameter as conditions, for all learning intervals. For example, the rule evaluation unit 16 searches for a combination, with regard to which learning interval and other learning parameter need to be selected at which timing in order to minimize the overall error index of all intervals. Here, the rule evaluation unit 16 searches for a combination that maximizes performance, using some kind of combination optimization algorithm.

For example, the rule evaluation unit 16 may use a forward-backward greedy algorithm (FoBa) used for coefficient selection of FAB and the like, as the combination optimization algorithm. Although the above describes whether or not the contents of update are restricted, the rule evaluation unit 16 may calculate the overall index based on whether or not the contents of learning are restricted.

The rule evaluation unit 16 may visualize a plurality of evaluation results together. Typically, the performance in the whole prediction object interval is improved if the conditions such as the restriction on the number of updates are relaxed. Accordingly, the rule evaluation unit 16 may, for example, plot evaluation results in a two-dimensional graph having the number of updates and the overall index as respective axes. Such visualization of evaluation results enables the administrator to manually determine an appropriate result.

The method of visualization is not limited to a two-dimensional graph. For example, in the case of expressing the overall index by a plurality of indices, the rule evaluation unit 16 may visualize evaluation results on a (N−1)-dimensional curved surface in N dimensions.

As described above, according to this exemplary embodiment, the rule evaluation unit 16 evaluates an update rule by comparing the maximum performance attainable in the whole prediction object interval and the performance in the case of applying the update rule to be evaluated. This enables humans to determine the suitability of the update rule based on objective evaluation results.

Although FIG. 8 depicts an example where the rule evaluation unit 16 evaluates the update rule based on the output of the result output unit 15, the input to the rule evaluation unit 16 is not limited to the output of the result output unit 15. The rule evaluation unit 16 in this exemplary embodiment evaluates the update rule based on the result of an offline strategy. Accordingly, if the evaluation index of the prediction interval is calculable, the rule evaluation unit 16 may be realized as a discrete rule evaluation apparatus for receiving an update rule to be evaluated and evaluating the rule.

Figure 9:
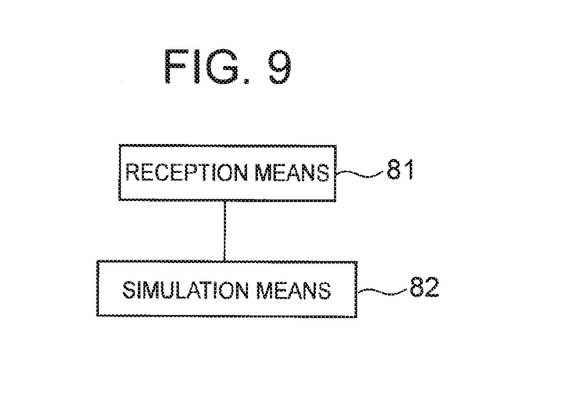
FIG. 9 is a block diagram schematically depicting a simulation system according to the present invention.

The following describes an overview of the present invention. FIG. 9 is a block diagram schematically depicting a simulation system according to the present invention. The simulation system according to the present invention includes: reception means 81 (e.g. the simulation information input unit 13) which receives an estimator learned using measured data (e.g. learning data) up to a point of time in the past, verification data that is measured data from the point of time onward, and an update rule (e.g. an update rule including a relearning rule and an evaluation rule) prescribing whether or not the estimator needs to be updated based on an evaluation index; and simulation means 82 (e.g. the simulation unit 14) which simulates at least one of the evaluation index (e.g. accuracy index) of the estimator and an update result (e.g. the number of updates, the cost required for updating) of the estimator in a predetermined period, based on the update rule and an estimation result calculated by applying the verification data of the predetermined period to the estimator in chronological order.

With such a structure, the suitability of the rule for updating the estimator can be simulated.

In detail, the simulation means 82 may simulate the number of times the estimator is updated in the predetermined period, as the update result of the estimator.

The simulation means 82 may apply the verification data to the estimator in chronological order to calculate the estimation result, and in the case where the evaluation index calculated based on the estimation result up to a determination point of time conforms to the update rule, update the estimator based on a method prescribed by the update rule, and apply the verification data from the determination point of time onward to the updated estimator in chronological order to calculate an estimation result. In this way, the update rule can be simulated using past learning data.

The simulation system may include output means (e.g. the result output unit 15) which outputs the simulated at least one of the evaluation index and the update result, as a simulation result. The output means may set, in each dimensional axis in a multidimensional space, any of the evaluation index and an index representing the update result, and plot the simulation result at a corresponding position in the multidimensional space (see the graph in FIG. 3 as an example). Such a structure aids the administrator in evaluating the update rule.

The simulation system may include search means (e.g. the estimator update unit 23) which searches for an optimal solution for the simulated evaluation index and update result.

The simulation system may include: estimator generation means (e.g. the estimator generation unit 12a) which generates the estimator using past measured data as learning data; and estimator storage means (e.g. the storage unit 11) which stores the generated estimator. The estimator generation means may generate the estimator using, as the learning data, data groups obtained by dividing the measured data into predetermined intervals, calculates the evaluation index at each prediction target indicating a timing at which each estimation is performed in the period during which the verification data is applied to the generated estimator in chronological order, generate a data set including the generated estimator and the evaluation index of each prediction target, and store the generated data set in the estimator storage means. The simulation means 82 may extract the evaluation index of a prediction target corresponding to a point of time of calculating the evaluation index from the estimator storage means, and in the case where the extracted evaluation index conforms to the update rule, extract a relearned estimator from the estimator storage means and update the estimator based on the update rule.

The simulation system may include rule evaluation means (e.g. the rule evaluation unit 16) which evaluates the update rule based on a simulation result. The rule evaluation means may evaluate the update rule, by comparing maximum performance (e.g. overall index) attainable in a whole prediction object interval from a point of time in the past onward and performance in the case of applying the update rule to be evaluated.

The reception means 81 may receive a plurality of estimators generated using different algorithms, and the simulation means 82 may perform the simulation for each of the plurality of estimators generated using the different algorithms.

REFERENCE SIGNS LIST

11 storage unit
12, 12a estimator generation unit
13 simulation information input unit
14, 14a simulation unit
15 result output unit
16 rule evaluation unit
21, 21a evaluation index calculation unit
22 estimator relearning unit
23 estimator update unit
24 estimator selection unit

The invention claimed is:

1. A simulation system comprising:
a hardware including a processor;
a reception unit, implemented by the processor, which receives an estimator learned using measured data up to a point of time in the past, verification data that is measured data from the point of time onward, and an update rule prescribing whether or not the estimator needs to be updated based on an evaluation index;
a simulation unit, implemented by the processor, which simulates at least one of the evaluation index of the estimator and an update result of the estimator in a predetermined period, based on the update rule and an, estimation result calculated by applying the verification data of the predetermined period to the estimator in chronological order;
an estimator generation unit, implemented by the processor, which generates the estimator using past measured data as learning data; and
an estimator storage unit which stores the generated estimator,
wherein the estimator generation unit generates the estimator using, as the learning data, data groups obtained by dividing the measured data into predetermined intervals, calculates the evaluation index at each prediction target indicating a timing at which each estimation is performed in the period during which the verification data is applied to the generated estimator in chronological order, generates a data set including the generated estimator and the evaluation index of each prediction target, and stores the generated data set in the estimator storage unit, and
the simulation unit extracts the evaluation index of a prediction target corresponding to a point of time of calculating the evaluation index from the estimator storage unit, and in the case where the extracted evaluation index conforms to the update rule, extracts a relearned estimator from the estimator storage unit and updates the estimator based on the update rule.

2. The simulation system according to claim 1, wherein the simulation unit simulates the number of times the estimator is updated in the predetermined period, as the update result of the estimator.

3. The simulation system according to claim 1, wherein the simulation unit applies the verification data to the estimator in chronological order to calculate the estimation result, and in the case where the evaluation index calculated based on the estimation result up to a determination point of time conforms to the update rule, updates the estimator based on a method prescribed by the update rule, and applies the verification data from the determination point of time onward to the updated estimator in chronological order to calculate an estimation result.

4. The simulation system according to claim 1, comprising
output unit, implemented by the processor, which outputs the simulated at least one of the evaluation index and the update result, as a simulation result,
wherein the output unit sets, in each dimensional axis in a multidimensional space, any of the evaluation index and an index representing the update result, and plots the simulation result at a corresponding position in the multidimensional space.

5. The simulation system according to claim 1, comprising
search unit, implemented by the processor, which searches for an optimal solution for the simulated evaluation index and update result.

6. The simulation system according to claim 1, comprising
rule evaluation unit, implemented by the processor, which evaluates the update rule based on a simulation result,
wherein the rule evaluation unit evaluates the update rule, by comparing maximum performance attainable in a whole prediction object interval from a point of time in the past onward and performance in the case of applying the update rule to be evaluated.

7. The simulation system according to claim 1, wherein the reception unit receives a plurality of estimators generated using different algorithms, and
the simulation unit performs the simulation for each of the plurality of estimators generated using the different algorithms.

8. A simulation method performed by a computer, comprising:
- receiving an estimator learned using measured data up to a point of time in the past, verification data that is measured data from the point of time onward, and an update rule prescribing whether or not the estimator needs to be updated based on an evaluation index; and
- simulating at least one of the evaluation index of the estimator and an update result of the estimator in a predetermined period, based on the update rule and an estimation result calculated by applying the verification data of the predetermined period to the estimator in chronological order;
- generating the estimator using past measured data as learning data; and
- storing the generated estimator,
- generating the estimator using, as the learning data, data groups obtained by dividing the measured data into predetermined intervals, calculates the evaluation index at each prediction target indicating a timing at which each estimation is performed in the period during which the verification data is applied to the generated estimator in chronological order, generating a data set including the generated estimator and the evaluation index of each predication target, and storing the generated data, and
- extracting the evaluation index of a prediction target corresponding to a point of time of calculating the evaluation index, and in the case where the extracted evaluation index conforms to the update rule, extracting a relearned estimator and updating the estimator based on the update rule.

9. The simulation method according to claim 8, wherein the computer simulates the number of times the estimator is updated in the predetermined period, as the update result of the estimator.

10. Anon-transitory computer readable information recording medium storing a simulation program, when executed by a processor, which performs a method for:
- receiving an estimator learned using measured data up to a point of time in the past, verification data that is measured data from the point of time onward, and an update rule prescribing whether or not the estimator needs to be updated based on an evaluation index; and
- simulating at least one of the evaluation index of the estimator and an update result of the estimator in a predetermined period, based on the update rule and an estimation result calculated by applying the verification data of the predetermined period to the estimator in chronological order:
- generating the estimator using past measured data as learning data; and
- storing the generated estimator,
- generating the estimator using, as the learning data, data groups obtained by dividing the measured data into predetermined intervals, calculates the evaluation index at each prediction target indicating a timing at which each estimation is performed in the period during which the verification data is applied to the generated estimator in chronological order, generating a data set including the generated estimator and the evaluation index of each prediction target, and storing the generated data, and
- extracting the evaluation index of a prediction target corresponding to a point of time of calculating the evaluation index, and in the case where the extracted evaluation index conforms to the update rule, extracting a relearned estimator and updating the estimator based on the update rule.

11. The non-transitory computer-readable recording medium according to claim 10, simulating the number of times the estimator is updated in the predetermined period, as the update result of the estimator.

* * * * *

UNITED STATES PATENT AND TRADEMARK OFFICE
CERTIFICATE OF CORRECTION

PATENT NO. : 10,635,078 B2
APPLICATION NO. : 15/553629
DATED : April 28, 2020
INVENTOR(S) : Akira Tanimoto, Yousuke Motohashi and Mamoru Iguchi It is certified that error appears in the above-identified patent and that said Letters Patent is hereby corrected as shown below:

In the Claims

Column 15, Line 64; In Claim 1, delete "an," and insert --an-- therefor

Column 18, Line 1; In Claim 10, delete "Anon-transitory" and insert --A non-transitory-- therefor Column 18, Line 14; In Claim 10, delete "Anon-transitory" and insert --A non-transitory-- therefor Signed and Sealed this
Seventeenth Day of November, 2020

Andrei Iancu
*Director of the United States Patent and Trademark Office*